July 13, 1971     G. S. MILLER ETAL     3,592,603
BROAD SPECTRUM pH INDICATOR AND METHOD
Filed May 1, 1968
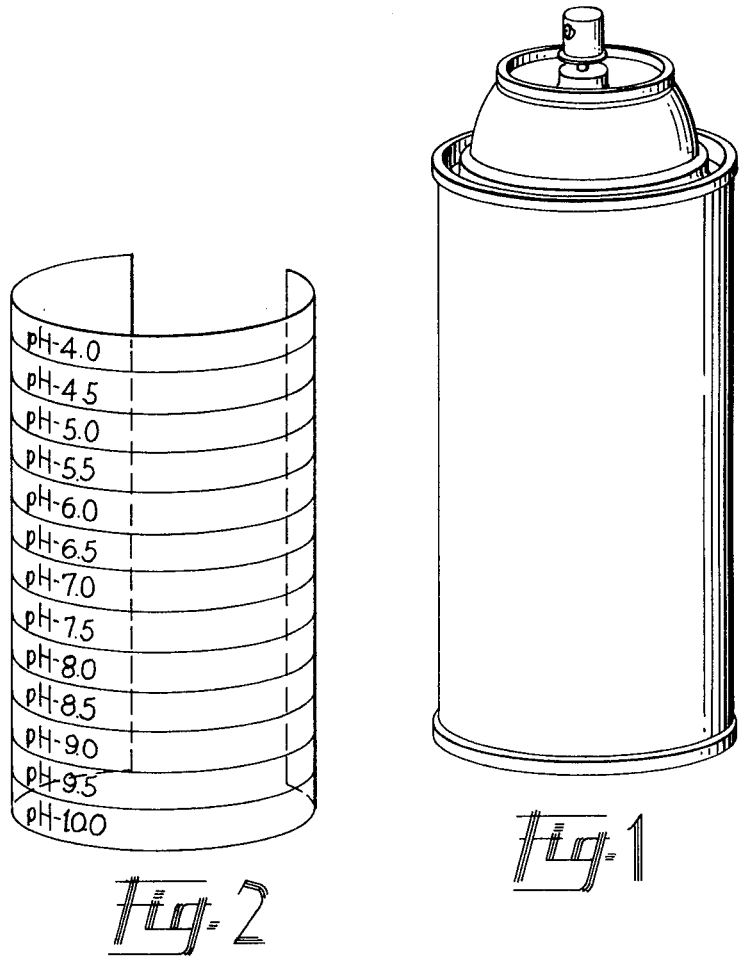
INVENTOR/S
GEORGE S MILLER &
ROBT. A. BENSON,
BY *Melville, Strasser, Foster and Hoffman*
ATTORNEYS

United States Patent Office 3,592,603
Patented July 13, 1971

3,592,603
BROAD SPECTRUM pH INDICATOR AND METHOD
George S. Miller and Robert A. Benson, Indianapolis, Ind., assignors to A. R. Stryker, Lawrenceburg, Ind.
Filed May 1, 1968, Ser. No. 725,860
Int. Cl. C09k *3/30;* G01n *31/22, 33/10*
U.S. Cl. 23—230                                                                 4 Claims

ABSTRACT OF THE DISCLOSURE

A broad spectrum pH indicator consisting essentially of the combination of methyl red, bromthymol blue, phenolphthalein, and a-naphtholphthalein. The indicator provides thirteen color changes in a range of pH 4–10 and is useful in a novel method of determining pH as a quality control check.

---

This invention relates to a new and improved pH indicator and more particularly relates to the use of a broad spectrum pH indicator in quality control checks.

There are a number of industries such as the bread industry, textile industry, dairy industry and the like where control measures are totally unsatisfactory during production. Only after the product has been completed is it possible to determine whether or not the batch was "good." This results in untold losses every year.

A prime example can be found in the production of canned biscuits. There has been no effective way for the production worker, who is normally not a trained chemist or technician, to check the quality of the raw biscuit dough. As a result, the product can be processed with improper ingredient levels, resulting in a poor quality product reaching the consuming public. Often the products will spoil, due to abuse at high temperatures, such as during improper storage, etc. The indicator enables a rapid test to reveal a lowered pH due to acid production of spoilage bacteria. This also applies to a change in pH, from the normal, in other food products within the range of the indicator.

Such a method must be rapid, dependable and simple enough for the production worker to use and evaluate with ease, accurate enough to detect variations from the normal product and must employ a stable reagent.

Therefore, it is a primary object of the present invention to provide a simple, efficient and accurate quality control check of various materials such as raw dough during production.

It is a further object of the present invention to provide a broad spectrum pH indicator which produces thirteen distinct color changes from pH 4 to 10 which is useful as a quality control agent.

The indicator of the present invention consists essentially of a solution containing methyl red, bromthymol blue, phenolphthalein and a-naphtholphthalein. More specifically, the indicator is represented by the following preferred composition:

9.31% of 1% methyl red,
4.65% of 1% bromthymol blue,
4.65% of 1% phenolphthalein,
4.65% of 1.5% a-naphtholphthalein,
the balance distilled water and alcohol.

The indicator, while broad in its spectrum, is sufficient to reflect the pH of a substance to within ½ point in the scale of 4–10. A specific pH is assigned to the substance by comparing the color of a tested portion of same with a predetermined spectrum of colors ranging from red, indicating a pH of 4, to violet which is pH 10. Specifically, it was determined that with an indicator having the preferred composition set forth above, the following colors were observed:

| pH value: | Color |
| --- | --- |
| 4.0 | Rose red. |
| 4.5 | Pink. |
| 5.0 | Peach. |
| 5.5 | Light orange. |
| 6.0 | Yellow. |
| 6.5 | Chartreuse. |
| 7.0 | Light green. |
| 7.5 | Forest green. |
| 8.0 | Blue-green. |
| 8.5 | Light turquoise. |
| 9.0 | Light blue. |
| 9.5 | Deep blue. |
| 10.0 | Violet. |

Each color of the spectrum, or variations thereof, may be defined by the three common attirbutes of hue, saturation and brilliance. It is a change in one or more of these factors which causes a visible shift on the spectrum scale to one end or the other. In the present invention, care must be taken to insure the proper amounts and numbers of ingredients in the indicator to observe these visible changes in color. Therefore, for optimum results, i.e., sharp end points revealing thirteen distinct colors, adherence to the preferred composition is recommended.

The broader aspect of this invention contemplates limited variation from the preferred composition. For example, since it is possible to produce the four primary ingredients (methyl red solution, bromthymol blue solution, phenolphthalein solution, a-naphtholphthalein solution) in various strength levels within their solubility limits, it is necessary only to maintain the approximate ratio of 4:2:2:3 respectively, where the ratio proportion of each is determined by the following formula:

Ratio proportion = strength × volume

Thus, it is possible to decrease the volume of the ingredient added by increasing strength. That is, 5 cc. of a 2% solution is equal to 10 cc. of a 1% solution.

In order to obtain approximately 100 cc. of the indicator of the present invention, 10 cc. of a 1% methyl red solution, 5 cc. of a 1% bromthymol blue solution, 5 cc. of a 1% phenolphthalein solution and 5 cc. of a 1.5% a-naphtholphthalein solution are mixed in a 100 cc. volumetric flask. The mixed indicator is diluted to 100 cc. by the addition of 17 cc. distilled water, 15 cc. of 95% pure methanol or ethanol and the balance 50% alcohol. The 50% alcohol may be prepared by a 48 to 52 ratio of 95% pure methanol and distilled water. Thus, the balance is essentially an equal measure of distilled water and substantially pure alcohol. However, variations from this ratio are contemplated within the scope of this invention. All of the dyes are prepared in alcohol, with the exception of the bromthymol blue, which is normally prepared at the 1% level in distilled water with about 16% 0.1 N sodium hydroxide. If the latter dye is prepared without sodium hydroxide, the result is lighter shades or less distinct changes in color. On the other hand, if methyl red is prepared with sodium hydroxide, the same problem occurs.

While there are a number of ways in which the broad spectrum indicator can be applied, application to a small quantity of the material to be tested from an aerosol container or squeeze container is the most efficient. A typical container illustrated in FIG. 1, is provided with a color chart thereon, shown detached as FIG. 2, and illustrates the thirteen color changes. The production worker takes a sample, squirts the indicator on the material and compares the color of the material with the chart on the can. The colors on the chart are arranged according to the pH values they indicate. The worker in any given industry and concerned with a specific product or material will be given instructions as to what is a permissible pH range for that material. If the test produces a color in the pH range outside of that permitted, the worker knows that something is wrong and that steps must be taken to remedy the situation. Examples will follow.

The improper ingredient level regarding leavening in raw dough can be detected as follows: The indicator produces a yellow-green or chartreuse color on normal biscuit dough. If a blue-green to violet (pH 8–10) color develops, this could indicate an excess of soda or a deficiency of the sodium acid pyrophosphate. On the other hand, if a yellow to red color develops (pH 6–4), this could indicate an excess of sodium acid pyrophosphate or a deficiency of the soda. Thus, the loss of running "bad product" can be avoided.

Similarly, an "on the spot" quality control check of vat dyes would be invaluable to the textile industry. For instance, if organisms are present in the dye tanks, an iridescent streaking effect is produced in white cloth. The organism can be detected if the dye turns blue when the indicator is added thereto.

The uses of this broad spectrum indicator are virtually unlimited and have application in checking swimming pool water, treated sewer water, cookie dough, macaroni dough, instant potatoes, air and water pollution, checking natural and manufactured gas for too much or too little $SO_2$, checking food products for contaminants and bacteria, and the like.

Thus, an effective and efficient method has been presented which allows a totally untrained production worker to tell whether a particular batch is all right. If, when the worker takes a sample of the raw product or material and applies the indicator thereto and obtains the wrong color, production is immediately stopped. The analytical laboratory can then check to see if the product is irreparably lost or if it can be brought back to an acceptable condition. This results in substantial saving. It will be noted that the most astonishing facet of this invention is that it readily facilitates the detection of the hydrogen ion concentration in various solid materials as well as liquids and provides a novel quality control means.

The use of the aerosol can with the color chart thereon makes possible immediate, on the spot checking by relatively unskilled persons. Materials don't have to be sent to a lab or the like for testing. The can, its chart, and its contents thus comprise an economical, portable lab in and of itself.

It should be apparent from the foregoing that the utilization of the four primary dyes, in combination with alcohol and distilled water, results in an indicator solution capable of detecting pH variations from 4–10. If one or more of these dyes are omitted, the pH detecting range is reduced. The following table reflects this latter phenomenon.

restricted but satisfactory indicator. Therefore, it is contemplated as one aspect of this invention to provide a limited spectrum pH indicator by utilizing only three of the indicated dyes. Where one of the dyes is omitted, the respective proportions of the dyes used will fall within the ratio and formula detailed above, namely: 4:2:3, 4:2:2 and 2:2:3.

Referring back to the table, it will be recalled that a 50% change in the methyl red solution produced an indicator whose color shades were too light—the sharp end points were lost. Nevertheless, it is possible to deviate from the prescribed proportions and still be within the scope and spirit of this invention. Therefore, it is further contemplated that variations on the order of ±10% are possible with respect to the dyes: bromthymol blue, phenolphthalein, and a-naphthophthalein. However, with the methyl red dye, the variations may be on the order of +0% to −25%.

While the invention has been disclosed and described in some detail in the foregoing description, this is to be considered as illustrative and not restrictive in character, as other modifications may readily suggest themselves to persons skilled in this art and within the broad scope of the invention, reference being made to the appended claims.

What we claim is:

1. The method of determining the pH of a substance comprising the step of contacting the substance to be tested with an indicator consisting essentially of the following in amounts by volume percent, 9.31% of 1% methyl red solution, 4.65% of 1% bromthylmol blue solution, 4.65% of 1% phenolphthalein solution, 4.65% of 1.5% a-naphtholphthalein, with the balance alcohol and distilled water, whereby to obtain distinct color changes in accordance with the pH value of said substance.

2. The method of determining the pH of a food product comprising the step of contacting said food product with an indicator consisting essentially of methyl red, a-naphtholphthalein, and at least one member selected from the group consisting of bromthymol blue and phenolphthalein, whereby to obtain a distinct color on said food product and comparing said color to a predetermined standard acceptable for said food product.

3. The method of claim 2 wherein said food product is raw dough.

4. The combination of an indicator composition for use in determining the hydrogen ion concentration of solid and liquid material which exhibits distinct color changes upon being subjected to a change in hydrogen ion concentration, said indicator composition consisting essentially of 9.31% by volume of a 1% methyl red solution, 4.65% by volume of a 1% bromthymol blue solution, 4.65% by volume of a 1% phenolphthalein solution, 4.65% by volume of a-naphtholphthalein, with the balance alcohol and distilled water, an aerosol container containing said inicator, and a color chart on said

TABLE

| Indicator solution | 1% methyl red | 1% brom. blue | 1% phen. | 1.5% a-nap. | Results |
| --- | --- | --- | --- | --- | --- |
| A | 10 | 5 | 0 | 5 | pH range limited to 4-8. |
| B | 10 | 5 | 5 | 0 | pH range limited to 4-6. |
| C | 10 | 0 | 5 | 5 | pH range limited to 6-8. |
| D | 0 | 5 | 5 | 5 | No color change in pH range of 4-6. |
| E | 5 | 5 | 5 | 5 | Color shades to light for accurate pH detection |

NOTE: The quantity numbers represent vol. percent in an indicator solution where the balance is alcohol and water.

This table would indicate that in certain applications where a limited pH range is encountered, it is possible to eliminate one of the primary dyes to produce a container depicting the color changes capable of being indicated by said indicator composition.

(References on following page)

References Cited

UNITED STATES PATENTS

| | | | |
|---|---|---|---|
| 2,544,093 | 3/1951 | Kilgore | 252—305X |
| 2,567,445 | 9/1951 | Parker | 23—253TPX |
| 2,659,704 | 11/1953 | Kerr | 252—305X |

OTHER REFERENCES

Merck Index, 7th ed., p. 704.

McCrumb, F. R., Anal. Chem. 3, No. 3, July 15, 1931, pp. 223–235.

Britton, H.T.S., Hydrogen Ions, vol. 1, D. Van Nostrand Co. Inc., 1943, pp. 358–359 relied on.

MORRIS O. WOLK, Primary Examiner

R. M. REESE, Assistant Examiner

U.S. Cl. X.R.

23—253, 99—192, 252—305, 408